Nov. 19, 1946.     G. V. ELTGROTH     2,411,198
RADIO APPARATUS
Filed Nov. 7, 1941     2 Sheets-Sheet 1

INVENTOR.
GEORGE V. ELTGROTH
BY
Joseph Q. Stanfield
ATTORNEY.

Nov. 19, 1946.  G. V. ELTGROTH  2,411,198
RADIO APPARATUS
Filed Nov. 7, 1941  2 Sheets-Sheet 2

INVENTOR.
GEORGE V. ELTGROTH
BY Joseph Q. Stansfield
ATTORNEY.

Patented Nov. 19, 1946

2,411,198

UNITED STATES PATENT OFFICE 2,411,198

RADIO APPARATUS

George V. Eltgroth, Towson, Md., assignor to Bendix Aviation Corporation, South Bend, Ind., a corporation of Delaware Application November 7, 1941, Serial No. 418,143

14 Claims. (Cl. 250—11)

1

This invention relates to radio receiving apparatus and more particularly to directional radio receiving apparatus used in conjunction with loop antennas.

Radio direction finding apparatus providing unilateral reception (cardioidal polar pattern of reception) requires that the phase and amplitude of the currents derived from the vertical antenna and the loop antenna bear certain fixed relationships to each other. In an electromagnetic field of constant field strength but varying frequency, the voltage developed in a loop antenna varies directly with the frequency, so long as the loop dimensions are small by comparison with the wavelength of the received electromagnetic energy. Concerning ourselves for the moment only with the required constant amplitude relationship, it is seen that some special provision must be made to render the output voltage from the loop antenna constant under the above conditions. The problem has been met in the past by several arrangements, summarized below.

To secure maximum sensitivity of the receiving apparatus, the loop antenna is usually tuned and the voltage across the loop may be mathematically expressed as $Q \times e$ (where $Q$ is the ratio of reactance to resistance in the tuned circuit of which the loop is a part and $e$ is the voltage induced in the loop at maximum linkage with the incident wave). Since $e$ varies linearly with the frequency, the output voltage may be rendered constant by making $Q$ inversely proportional to the frequency. This has been done by placing resistive loading effectively across the loop, and the entire voltage developed across the tuned loop circuit was then connected to the input circuit of the amplifier tube coupling the loop circuit to the mixing circuit. In multi-band equipment, the chief disadvantage of this method, as will be shown later, is that the sensitivity of the equipment on the high frequency bands cannot be better than that on the lowest frequency band if good unilateral ratios (ratio of cardioid maximum to cardioid minimum) are to be obtained.

Another arrangement which has been used in providing the desired ratio between the loop currents and the antenna currents in the mixing circuit, is to provide a balancing control which varies the gain of the loop and/or antenna amplifiers. The operator is then required to adjust this control for satisfactory unilateral ratios. The advantage of this method lies in the somewhat greater sensitivity of the receiving equipment, but this is far outweighed by the fact that, under emergency conditions the operator was not able to perform the balancing operation rapidly enough to take the bearings leading a craft out of dangerous territory. Furthermore, under conditions

2 of severe interference, the operator was never sure of obtaining good balance. For these reasons, this latter method is falling into disuse and we may confine our attention to the first method described for securing constant voltage input to the loop amplifier.

One of the principal objects of this invention is to provide radio direction finding equipment having improved performance and greater reliability.

Another object of this invention is to provide multiband radio direction finding equipment having improved sensitivity and more accurate determination of the true direction of a source of electromagnetic energy.

Still another object of this invention is to provide circuit means for securing substantially constant output voltage from a loop antenna tunable over a plurality of bands situated in a field of constant strength and varying frequency, while at all times maintaining optimum signal-to-noise ratio in that output voltage.

Other objects and advantages will in part be disclosed and in part be obvious when the following specification is read in conjunction with the drawings, in which.

Figure 1:
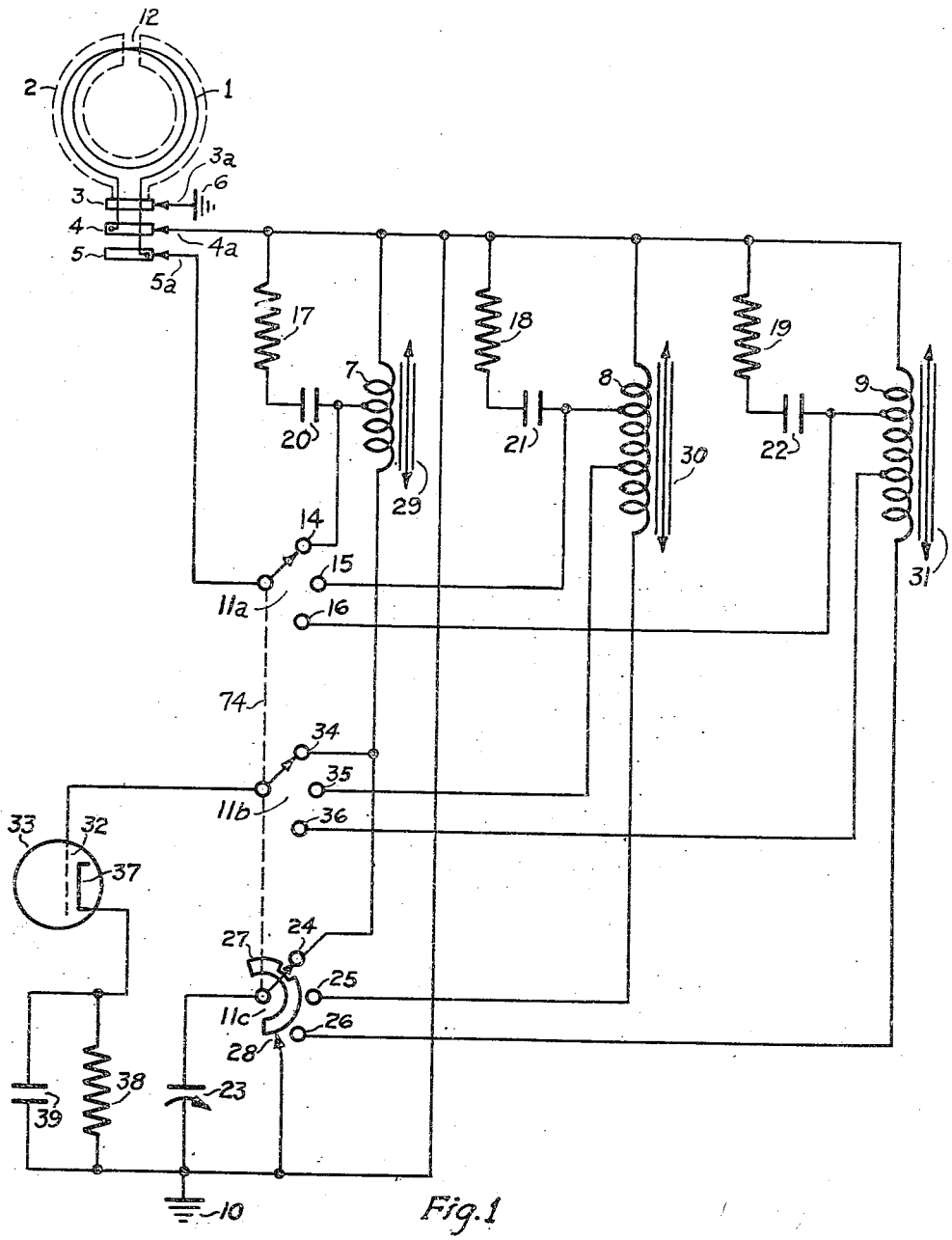
Figure 1 is a schematic diagram illustrating my invention.

It is to be understood that these drawings are intended to illustrate a preferred form of the invention, and are not to comprise a limitation on the content or scope of the invention.

In the drawings, like parts are designated by like reference characters.

Referring now to Figure 1, the loop 1 is located within the metallic shield 2 having an insulated gap 12. This assembly is mounted on a rotatable shaft carrying the slip rings 3, 4, 5. Slip ring 3 is connected to the shield 2 and is connected to the ground 6 through the contacting brush 3a. One terminal of the loop winding 1 is connected to the slip ring 4 and from here, the brush 4a completes the circuit to one terminal of each of the auto-transformer windings 7, 8, and 9, all of which are in turn connected to the ground 10. For the purpose of tuning the loop 1 over a number of frequency bands, the frequency selector switch 11 comprising the ganged sections 11a, 11b, and 11c simultaneously operated by the shaft 14 is provided. The wiper arm of section 11a is connected to the other terminal of the loop winding 1 through the brush 5a and the slip ring 5 while the three stationary contacts 14, 15 and 16 are respectively connected to the primary taps on the auto-transformer windings 7, 8, and 9. Across the primary input terminals of the auto-transformer windings 7, 8, and 9 there are connected respectively the equalizing resistors 17, 18, 19 and the equalizing capacitors 20, 21, 22, proportioned to maintain the loop output voltage substantially constant over the associated tuning band. The loop winding 1 is tuned through the selected auto-transformer by the variable capacitor 23, which is connected between the ground 10 and to the wiper arm of switch section 11c. Rotation of the wiper arm successively connects capacitor 23 to the stationary contacts 24, 25, 26 and thus to the high potential terminal of the selected auto-transformer. The short-circuiting ring 27 short-circuits the windings of all auto-transformers which are not in use, the ground connection being established through the wiping contact 28. This is the usual practice followed to avoid energy absorption from the active transformer by inactive transformers whose natural resonance frequencies lie within the selected working range. The exact frequency coverage of each band may be altered by the adjustment of the movable iron cores 29, 30, 31 which are a part of their individual auto-transformers. Auto-transformer 7 is utilized in conjunction with reception on the lowest band of frequencies over which the equipment is designed to operate.

A relay means which may comprise control electrode 32 of electric discharge tube 33 is selectively connected to the high potential terminal of auto-transformer 7, or to a tap on auto-transformers 8 or 9 as the wiper arm of switch section 11b engages stationary contacts 34, 35, or 36. To complete the input circuit and provide operating bias for the electric discharge tube 33, the cathode 37 is connected to the ground 10 through the bias resistor 38 paralleled by the bypass capacitor 39. The relay tube 33 is shown in Figure 1 in simplified form for clarity, and may be utilized as a loop amplifier, such use being shown in more detail in Figure 2.

The above described arrangement differs from previous similar apparatus in that the entire tuned circuit voltage is impressed on the control electrode 32 only on the band covering the lowest operating frequencies; on the higher frequency band or bands the control electrode 32 is tapped down on the tuned circuit to provide the unobvious result of improved sensitivity when measured at constant signal-to-noise ratio, as compared with previous equipment supplying substantially constant input voltage to the control electrode 32 when the loop 1 is situated in a constant field strength of varying frequency, said loop being tuned to resonance with the received frequency.

In operation, of course, the tuning capacitor 23 is adjusted for maximum voltage of the desired signal on the control electrode 32, the loop 1 being tuned by the reflected capacity appearing across the primary of the active auto-transformer. The equalizing resistors and condensers are chosen to maintain the voltage developed across the capacitor 23 substantially constant as signals of constant field strength are tuned in at any point within the operating range of the associated transformer and the tuning capacitor 23.

In understanding this perhaps paradoxical improvement in sensitivity resulting from the decrease in voltage applied to the loop amplifier grid, it will prove helpful to review a few fundamental relationships. It has been found that in a well designed amplifier of this type, the sensitivity is limited by the noise voltage due to thermal agitation in the first tuned circuit, and not by the noise generated within the amplifier tube. We shall therefore, confine ourselves to investigation of the signal-to-noise ratio existing in the tuned circuit which is connected to the control electrode 32, as it is now readily seen that, within reasonable limits, the same signal-to-noise ratio will exist in the output of the loop amplifier whether the control electrode is connected to the full tuned circuit voltage or to a fraction of that voltage. The difference in absolute gain from the loop to the loop amplifier output can easily be made up by increasing the gain of the succeeding amplifiers so that the limiting sensitivity imposed by the initial signal-to-noise ratio may always be realized.

The following equations presuppose a field of constant strength, but variable frequency, and that the loop antenna is maintained in the position of maximum flux linkage.

$$e = Kf \quad (1)$$

$e$ = Voltage induced in the loop by the incident energy.
$K$ = Constant determined by the loop configuration and the field strength.
$f$ = Frequency of the incident energy in cycles per second.

$$E = Qe \quad (2)$$

$E$ = Tuned circuit voltage developed across loop when it is tuned to resonance with the impressed frequency.
$Q$ = Operating Q of the tuned circuit, including the loop, at the impressed frequency.

It is desired that E be maintained constant regardless of the operating frequency of the system. This is generally done by making:

$$Q = \frac{Q'}{f} \quad (3)$$

$Q'$ = Q of the tuned loop circuit at the low frequency end of the low frequency band. This value of Q is employed because the Q of the loop circuit usually rises with increasing frequency. Then $$E = \frac{Q'}{f} \times Kf = KQ' \quad (4)$$

and is constant.

The noise voltage generated in the tuned circuit by thermal agitation is given by the expression:

$$N = K'\sqrt{Z} \quad (5)$$

$N$ = The noise voltage.
$K'$ = Constant depending on the absolute temperature of the circuit and the overall selectivity of the receiving apparatus.
$Z$ = The real component of the resonant circuit impedance $$Z = QX \quad (6)$$

$X$ = The reactance of the elements of the tuned circuit. It is proportional to the frequency to which the circuit is tuned when the circuit is tuned by varying the capacitance. Therefore $$X = K''f \quad (7)$$

$K''$ = A constant for a given circuit.

Substituting (3) and (7) in (6):

$$Z = \frac{Q'}{f} \times K''f = K''Q' \quad (8)$$

Combining (5) and (8):

$$N = K'\sqrt{K''Q'} \quad (9)$$

The signal-to-noise ratio (S/N) existing in the output voltage of the tuned circuit is now readily found by performing the indicated operation utilizing (4) and (9):

$$S/N = \frac{E}{N} = \frac{KQ'}{K'\sqrt{K''Q'}} = K'''\sqrt{Q'} \quad (10)$$

$K'''$=The constant resulting from the combination of K, K', and K''.

Expressed in terms of operating results, (10) indicates that a loop receiving circuit developing constant tuned circuit output voltage will have a constant signal-to-noise ratio over its entire tuning range, whatever the frequency span and whatever the number of bands used in covering that frequency span, and that the signal-to-noise ratio is proportional to the square root of the Q of the tuned loop circuit at the low frequency end of the low frequency band, which is usually the worst point. For example, in a unilateral direction finder operating over the frequency range of 200 kcs. to 1500 kcs., the sensitivity at 1500 kcs., expressed in microvolts per meter, would be the same as that at 200 kcs. This is the case where the previous design practice has been employed.

In a particular equipment let us say that band 1 is the low frequency band, band 2 is the medium frequency band and that band 3 is the high frequency band. In apparatus incorporating my invention, the entire tuned circuit voltage is impressed on the control electrode of the loop amplifier only on band 1. With bands 2 or 3 operative, only a fraction of the entire tuned circuit voltage is impressed on this electrode.

Instead of making $$Q = \frac{Q'}{f} \quad (3)$$

over the entire frequency range, I let $$Q = \frac{Q'}{f} \text{ on band 1 only} \quad (3)$$

Thus, operation on this frequency band is unchanged.

$$Q = \frac{Q''}{f} \text{ on band 2} \quad (11)$$

$$Q = \frac{Q'''}{f} \text{ on band 3} \quad (12)$$

$Q'$=As before, the unloaded loop circuit Q at the low frequency end of band 1.
$Q''$=The unloaded loop circuit Q at the low frequency end of band 2.
$Q'''$=The unloaded loop circuit Q at the low frequency end of band 3.

In practice, $Q'''$ is greater than $Q''$ which is, in turn, greater than $Q'$. The resonance voltage across the tuned circuit is now no longer constant, but varies from band to band, remaining constant only within a given band.

Letting:

$E'$=The resonance voltage across the tuned circuit of band 1 (auto-transformer 7).
$E''$=The resonance voltage across the tuned circuit of band 2 (auto-transformer 8).
$E'''$=The resonance voltage across the tuned circuit of band 3 (auto-transformer 9).

From (4)

$$E' = E = KQ' \quad (13)$$

$$E'' = \frac{Q''E}{Q'} \quad (14)$$

$$E''' = \frac{Q'''E}{Q'} \quad (15)$$

If $V'$=The input voltage to the loop amplifier on band 1;
$V''$=The input voltage to the loop amplifier on band 2;
$V'''$=The input voltage to the loop amplifier on band 3 we can make $V'=V''=V'''$ by tapping off selected fractions of the total tuned circuit voltage. Let $a'$, $a''$, and $a'''$ be the fractional part of the voltage picked off from the tuned circuit on bands 1, 2, and 3 respectively.

By design make $$a' = 1 \quad (16)$$

$$a'' = \frac{Q'}{Q''} \quad (17)$$

$$a''' = \frac{Q'}{Q'''} \quad (18)$$

Combining (13) and (16)

$$V' = a'E = E \quad (19)$$

Combining (14) and (17)

$$V'' = a''E'' = \frac{Q'}{Q''} \times \frac{Q''E}{Q'} = E \quad (20)$$

Combining (15) and (18)

$$V''' = a'''E''' = \frac{Q'}{Q'''} \times \frac{Q'''E}{Q'} = E \quad (21)$$

As in preceding designs, the input voltage to the loop amplifier is maintained constant but with the outstanding advantage that the sensitivity of the apparatus becomes successively better by the square root of the ratio $Q''/Q'$ on band 2, and $Q'''/Q'$ on band 3, as the higher frequency bands are switched into service. See Equation 10.

In a direction finder which has been constructed in accordance with the principles of my invention, the following data has been obtained:

Frequency coverage:

| | Kcs. |
|---|---|
| Band 1 | 200–400 |
| Band 2 | 400–800 |
| Band 3 | 800–1,600 |

Unloaded loop circuit Q's:

| | |
|---|---|
| 200 kcs. | 25 |
| 400 kcs. | 50 |
| 800 kcs. | 95 |

Field strength in microvolts per meter required for 4/1 signal-to-noise ratio:

| | |
|---|---|
| Band 1 | 50 |
| Band 2 | 35 |
| Band 3 | 26 |

Direction finders previously constructed, identical with the above unit, except for the method of obtaining constant input voltage to the loop amplifier, required field strengths of 50 microvolts per meter over their entire tuning range. Thus, on band 3, a sensitivity improvement of nearly 2:1 has been achieved by the method of my invention.

Figure 2:
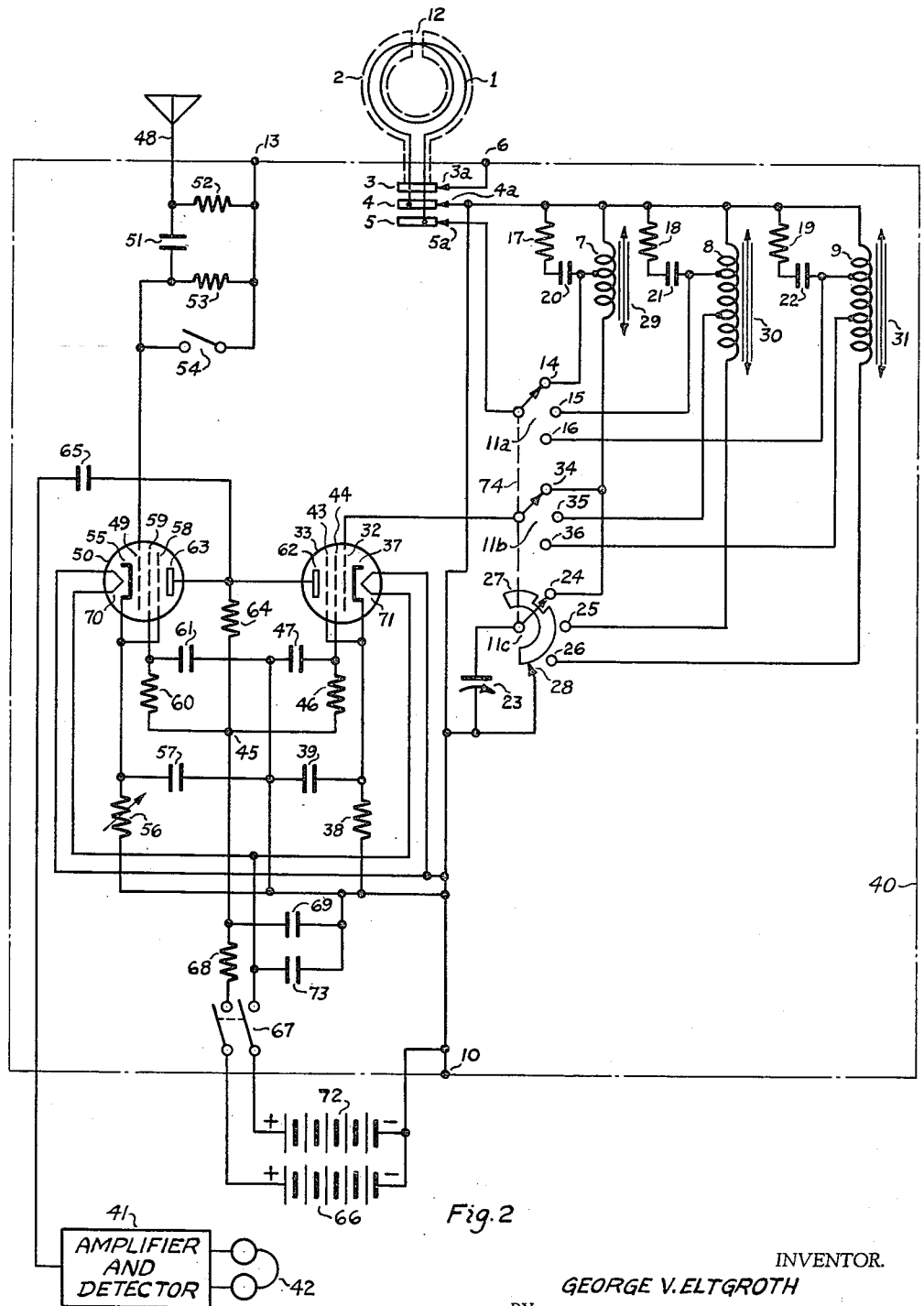
Figure 2 is a schematic diagram of improved radio direction finding apparatus incorporating my invention.

Referring now to Figure 2, the apparatus of Figure 1 is here shown incorporated in a radio direction finding unit. The loop and antenna signal combining circuits are housed in the grounded metallic case 40 and their combined output is fed to the amplifier and detector 41 which controls the indicator 42, here shown as a head telephone set. The input circuit to the electric discharge tube 33, optionally termed the loop amplifier, is the same as that shown in the previous figure. The vacuum tube designated commercially as the type 12SK7 may be advantageously employed in the practice of the invention. The suppressor grid 43 of the tube 33 is connected to the cathode 37, and the space charge grid 44 of the same tube is connected to the anode bus 45 through the dropping resistor 46, bypass capacitor 47 serving to maintain the space charge grid 44 at substantially ground potential.

An essentially non-directional antenna 48 is connected to the control grid 49 of electric discharge tube 50 through the blocking capacitor 51, resistor 52 providing a leakage path to the ground 13 for static potentials which may arise on the antenna 48. The direct current bias circuit for control electrode 49 is completed through the resistor 53 which is of a value sufficient to prevent any loss in the antenna voltage at the electrode 49. To enable modification of the directional pattern of the direction finder, the single-pole, single-throw switch 54 is provided, which optionally grounds the control grid 49 together with the antenna 48. The direct current path from cathode 55, of tube 50, to ground is completed through the adjustable resistor 56, while bypass capacitor 57 maintains the cathode 55 at ground potential for alternating currents. The suppressor grid 58 is connected directly to the cathode 55, and the space charge grid 59 is connected to the anode bus 45 through the dropping resistor 60, bypass capacitor 61 serving to maintain the space charge grid 59 at substantially ground potential for high frequency currents. The anode 62 of tube 33 and the anode 63 of tube 50 are both connected to one terminal of the load resistor 64, and to their junction the amplifier and detector 41 is connected through the output coupling capacitor 65. The other terminal of load resistor 64 is connected to the anode bus 45.

The anode bus 45 receives direct current energy from the source 66, which may be of approximately 200 volts potential, through the power switch 67 and the filter resistor 68. The filter resistor 68 operates in conjunction with the filter condenser 69 to prevent externally generated interference currents from appearing at the anodes of the amplifier tubes. The heater 70 in tube 50 and the heater 71 in tube 33 provide electron emission from their associated cathodes when the heaters are energized. The heaters are connected in parallel, one side of the circuit being grounded to the ground 10 while the other is connected to the source 72 through the power switch 67. In a particular case where type 12SK7 tubes were employed as amplifiers, the potential of source 72 was 12–14 volts. Interference currents are eliminated from the heater circuit by the bypass capacitor 73. The negative terminals of sources 66 and 72 are connected together and to the grounded case 40 of the equipment.

The theory of operation of this type of equipment is well known by those skilled in the art and, for that reason, will not be discussed here.

At the installation of this direction finding equipment, the resistor 56 is adjusted so that the antenna signal current in resistor 64 is equal to the loop signal flowing in the same resistor with the loop circuit tuned to the received frequency, at any point in the operating frequency spectrum of the equipment. Thereafter, with switch 54 open, a substantially perfect cardioid pattern of reception will be obtained as the loop 1 is rotated. With switch 54 closed the reception is the usual figure-of-eight polar diagram obtained with rotatable loop direction finders, affording sharp bearings but permitting directional ambiguity which is resolved by switching to the cardioid pattern.

In operating the installation, the switch 54 is closed, the loop 1 oriented for maximum response from the desired station and the capacitor 23 is carefully adjusted for maximum output of the selected signal. Switch 54 is now opened and the loop 1 is rotated until maximum response is again obtained. With the loop now held in this position, some sort of "remembering" device associated with the loop azimuth scale is adjusted which prevents bearings from being taken in the reciprocal sector on the next operation. As the next step, switch 54 is once more closed and the loop is oriented for minimum reception in the true sector, the bearing being read from the azimuth scale. As will be noted by those familiar with the art, the operations are those which are theoretically ideal in this type of equipment.

It may be wondered why the sensitivity for figure-of-eight reception cannot be improved by disconnecting the equalizing elements from the loop circuit. The answer is that it can, but when the equalizing elements are reconnected for cardioidal reception the phase of the voltage across the tuned loop circuit will be shifted to such an extent that very poor unilateral ratios are obtained. It is true that this ratio can be improved by careful retuning of capacitor 23, but the adjustment is so critical as to render it difficult, if not impossible, under emergency conditions in aircraft. It is so critical that, for the sake of safety, users of this type of equipment have tolerated the poor figure-of-eight sensitivity accompanying permanent connection of the equalizing elements rather than attempt to gain sensitivity in the manner above outlined. On all bands other than the lowest frequency band, the system of my invention considerably improves the formerly deficient sensitivity existing, during figure-of-eight reception.

In the design of the equalizing circuits, it may be preferable to permit the tuned circuit voltage from the loop to rise slightly with frequency, holding the rise to a sufficiently small amount to avoid serious impairment of the unilateral ratio of the cardioidal pattern. This permits a further decrease in loading, with still more sensitivity improvement. In actual use, a unilateral voltage ratio of 8:1 has been found entirely satisfactory.

While I have shown the loop 1 tuned through a transformer, this was merely for the purpose of matching a low impedance loop to a high impedance load, which was the input circuit of the loop amplifier. It is evident that the transformer might be dispensed with, and the loop 1 designed to be tuned directly by the capacitor 23 without departing from the spirit of the invention. In this case, the load circuit might even be connected to a tap on the loop itself. The system of the invention may be utilized to deliver constant voltage not only to the input circuit of a vacuum tube amplifier, but to any load circuit desired, which is here exemplified by said input circuit.

In still another modification of the invention the equalizing circuits may be connected across the tuning capacitor rather than across the loop. The impedances of the components are then so high, however, that it becomes more difficult to control the loading with the desired degree of precision.

It will be evident that many changes and modifications may be made in the invention without departing from the spirit thereof as expressed in the foregoing description and in the appended claims.

What I claim is:

1. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency, and means for applying a predetermined portion of said total response to relay means.

2. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency within a given band, and means for applying a predetermined fraction of said total response to relay means, said fraction being less than unity on all bands except that tuning to the lowest frequency.

3. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency within a given band, and means for applying a predetermined fraction of said total response to relay means, said fraction being different for each band and being less than unity on all bands except that band tuning to the lowest frequency.

4. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency within a given band, said means permitting the total response developed across said tuning means to vary from band to band, and means for applying a predetermined fraction of said total response to relay means, said fraction being different for each band and being less than unity on all bands except that band having the lowest total response.

5. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency within a given band, said means permitting the total response developed across said tuning means to vary from band to band, means for applying said total response to relay means on the band having the lowest total response, and means for applying a predetermined fraction of said total response to said relay means on all other bands.

6. The combination of a source of periodic energy, pickup means responsive to said energy, the response of said pickup means being a function of the frequency of the incident energy, means for tuning said pickup means to resonance with said incident energy over a predetermined range of frequency in a plurality of bands, means for maintaining the total response developed across said tuning means substantially independent of frequency within a given band, said means permitting the total response developed across said tuning means to vary from band to band, means for applying said total response to relay means on the band having the lowest response, and means for applying a predetermined fraction of said total response to said relay means on all other bands, said fraction being substantially equal to the ratio of the total response on the band having the lowest total response to the total response on the particular band in use.

7. The combination of a source of periodic energy, pickup means responsive to said energy, the response of said pickup means being a substantially linear function of the frequency of the incident energy, means for tuning said pickup means to resonance with said incident energy over a predetermined range of frequency in a plurality of bands, means for maintaining the total response developed across said tuning means substantially independent of frequency within a given band, said means permitting the total response developed across said tuning means to vary from band to band, means for applying said total response to relay means on the band having the lowest total response, and means for applying a predetermined fraction of said total response to said relay means on all other bands, said fraction being substantially equal to the ratio of the total response on the band having the lowest total response to the total response on the particular band in use.

8. The combination of a source of radiant electromagnetic waves, pickup means responsive to said waves, the response of said pickup means being a function of the frequency of the incident waves, means for tuning said pickup means to resonance with said incident waves over a predetermined range of frequency in a plurality of bands, means for maintaining the total response developed across said tuning means substantially independent of frequency within a given band, said means permitting the total response developed across said tuning means to vary from band to band, means for applying said total response to relay means on the band having the lowest total response, and means for applying a predetermined fraction of said total response to said relay means on all other bands, said fraction being substantially equal to the ratio of the total response on the band having the lowest total response to the total response on the particular band in use.

9. The combination of a source of radiant electromagnetic waves, a loop antenna, means for tuning said loop antenna to resonance with said waves over a predetermined range of frequency in a plurality of bands, means for maintaining the voltage developed across said tuning means substantially independent of frequency within a given band, said means permitting the voltage developed across said tuning means to vary from band to band, an electric discharge tube having input and output circuits, means for applying said voltage to said input circuit on the band having the lowest developed voltage, and means for applying a predetermined fraction of said voltage to said input circuit on all other bands, said fraction being substantially equal to the ratio of the developed voltage on the band having the lowest developed voltage to the developed voltage on the particular band in use.

10. The combination of a source of radiant electromagnetic waves, a loop antenna, means for tuning said loop antenna to resonance with the incident waves over a predetermined range of frequency in a plurality of bands, said means comprising a variable capacitor, a plurality of transformers, and means for selectively connecting said transformers between said capacitor and said loop; means for maintaining the voltage developed across said variable capacitor substantially independent of the frequency of the incident waves when said capacitor is adjusted to make the developed voltage a maximum, said voltage maintaining means permitting said voltage to vary from transformer to transformer, an electric discharge tube having input and output circuits, means for applying said voltage to said input circuit when the transformer having the lowest developed voltage is connected between said loop and said variable capacitor, and means for applying a predetermined fraction of said voltage to said input circuit when any other transformer is connected between said loop and said variable capacitor, said fraction being substantially equal to the ratio of the said lowest developed voltage to the voltage developed across said variable capacitor by said other transformer.

11. The combination of a source of radiant electromagnetic waves, a loop antenna, means for tuning said loop antenna to resonance with the incident waves over a predetermined range of frequency in a plurality of bands; said means comprising a variable capacitor, a plurality of transformers, and means for selectively connecting said transformers between said capacitor and said loop; a different network of resistance and capacity connected to each of said transformers, the resistance and capacity of each network being selected to maintain the voltage developed across said variable capacitor substantially independent of the frequency of the incident waves when said capacitor is adjusted to make the developed voltage a maximum but permitting said voltage to vary from transformer to transformer; an electric discharge tube having input and output circuits, means for applying said voltage to said input circuit when the transformer having the lowest developed voltage is connected between said loop and said variable capacitor, and means for applying a predetermined fraction of said voltage to said input circuit when any other transformer is connected between said loop and said variable capacitor, said fraction being substantially equal to the ratio of the said lowest developed voltage to the voltage developed across said variable capacitor by said other transformer.

12. In a radio direction finder having a non-directional antenna and a directional antenna, means for combining non-directional antenna controlled signal currents with directional antenna controlled signal currents, means for tuning said directional antenna to resonance with received energy over a predetermined range of frequency in a plurality of bands, means for maintaining the tuned output voltage of said directional antenna substantially constant within a given band, but permitting said voltage to vary from band to band, means for producing directional antenna controlled signal currents proportional to said tuned output voltage on the band having the lowest tuned output voltage, and means for producing directional antenna controlled signal currents proportional to a fraction of said tuned output voltage on all other bands.

13. In a radio direction finder having a non-directional antenna and a directional antenna, means for combining non-directional antenna controlled signal currents with directional antenna controlled signal currents, means for tuning said directional antenna to resonance with received energy over a predetermined range of frequency in a plurality of bands, means for maintaining the tuned output voltage of said directional antenna substantially constant within a given band, but permitting said voltage to vary from band to band, means for producing directional antenna controlled signal currents proportional to said tuned output voltage on the band having the lowest tuned output voltage, and means for producing directional antenna controlled signal currents proportional to a fraction of said tuned output voltage on all other bands, said fraction being substantially equal to the ratio of the tuned output voltage on the band having the lowest tuned output voltage to the tuned output voltage on said other band.

14. In a radio direction finder having a non-directional antenna and a loop antenna, means for combining non-directional antenna controlled signal currents with loop antenna controlled signal currents, means for tuning said loop to resonance with received energy over a predetermined range of frequency in a plurality of bands, means for maintaining the tuned output voltage of said loop antenna substantially constant within a given band, but permitting said voltage to vary from band to band, means for producing loop antenna controlled signal currents proportional to said tuned output voltage on the lowest frequency band, and means for producing loop antenna controlled signal currents proportional to a fraction of said tuned output voltage on all higher frequency bands, said fraction being substantially equal to the ratio of the tuned output voltage on the lowest frequency band to the tuned output voltage on the band in operation.

GEORGE V. ELTGROTH.